United States Patent
Tiwary et al.

(10) Patent No.: US 10,956,921 B2
(45) Date of Patent: Mar. 23, 2021

(54) METHODS AND DEVICES FOR COLLECTING INFORMATION ABOUT CONSUMER SPENDING

(71) Applicant: MasterCard International Incorporated, Purchase, NY (US)

(72) Inventors: Avyaktanand Tiwary, Gurgaon (IN); Sharan Bakshiram, Gurgaon (IN); Shikha Mittal, Faridabad (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 348 days.

(21) Appl. No.: 15/609,577

(22) Filed: May 31, 2017

(65) Prior Publication Data
US 2017/0352049 A1 Dec. 7, 2017

(30) Foreign Application Priority Data
Jun. 1, 2016 (SG) .......................... 10201604422U

(51) Int. Cl.
*G06Q 30/02* (2012.01)
*G06Q 40/00* (2012.01)
*G06Q 20/40* (2012.01)

(52) U.S. Cl.
CPC ..... *G06Q 30/0204* (2013.01); *G06Q 20/4093* (2013.01); *G06Q 40/12* (2013.12)

(58) Field of Classification Search
None
See application file for complete search history.

(56) References Cited

U.S. PATENT DOCUMENTS

| | | | | |
|---|---|---|---|---|
| 2012/0011070 A1* | 1/2012 | Ward | ..................... | G06Q 20/20 705/72 |
| 2012/0191534 A1* | 7/2012 | Tavares | .................. | G06Q 30/00 705/14.45 |
| 2017/0148098 A1* | 5/2017 | Miale | ..................... | G06Q 40/06 |
| 2017/0228725 A1* | 8/2017 | Jordan | .................. | G06Q 20/10 |

OTHER PUBLICATIONS

Alternative Payments and Credit Card Cannibalism (available Dec. 2013) <http://www.themerchantsguide.com/alternative-payments-credit-card-cannibalism.html> (Year: 2013).*

* cited by examiner

*Primary Examiner* — Alan Torrico-Lopez
(74) *Attorney, Agent, or Firm* — Otterstedt, Wallace & Kammer, LLP

(57) ABSTRACT

A server, with access to information about the spending of consumers, is operative to register when any of the consumers develops a new payment channel which is not tracked by a payment network. In respect of such consumers, the server automatically analyses the tracked spending behavior of the consumers before and after the new spending channel is opened, to identify differences between the spending behavior before and afterwards. By aggregating this information among multiple consumers, and multiple merchant classes, the server obtains data characterizing consumer spending using the new payment channel.

14 Claims, 4 Drawing Sheets

METHODS AND DEVICES FOR COLLECTING INFORMATION ABOUT CONSUMER SPENDING

CROSS-REFERENCE TO RELATED APPLICATIONS

This application claims foreign priority to Singapore Application 10201604422U filed Jun. 1, 2016, the complete disclosure of which is expressly incorporated by reference herein in its entirety for all purposes.

BACKGROUND OF THE INVENTION

The present invention relates to methods, devices and software for collecting information about consumer spending, particularly consumers who use a mobile wallet application.

Payment cards used by individuals (here "consumers") are conventionally associated with a payment network. FIG. 1 shows the basic operation of a conventional system. A consumer holds a payment card, typically a credit or debit card, issued by an issuer bank. The consumer goes to a POS (point-of-sales) terminal 1 operated to a merchant to make a purchase of a product. Note that the term "product" is used in this document to include any of physical objects, data products (such as music or software) or services. The POS terminal 1 reads the details of the payment card, and sends them, together with data including the amount of the purchase, to the server 3 of an acquirer bank at which the merchant maintains an account. The acquirer bank server 3 contacts a payment network server 5 of the payment network, and passes on the payment card details and the amount of the purchase. The payment network server 5 uses the payment card details to identify the issuer bank. The payment network server 5 contacts an issuer bank server 7 operated by the issuer bank, and sends it the payment card details and the amount of the purchase. The issuer bank server 7 decides either to authorize the purchase, or not to, and sends a corresponding message to the payment network server 5. The payment network server passes this information to the acquirer bank server 3, which passes the message back to the POS terminal 1. If the issuer bank server 7 authorized the transaction, then the purchase is now completed. At some later time (during clearing and settlement operations), the issuer bank transfers the payment amount to the acquirer bank.

The same basic scheme is used when the consumer, instead of using the POS terminal 1, uses a communication device 9 associated with the consumer to contact, using a communication network 11, a server 13 which functions as an online store. The communication device may be a smart phone, a tablet computer or a PC. In this case, the online store server 13 replaces the POS terminal 1 in the payment process described in the preceding paragraph. The consumer enters the payment card details into the communication device 9, or they may be pre-stored there.

Both situations described above give the payment network server 5 opportunities to collect valuable information about the spending habits of consumers. The payment transactions are recorded in a transaction database 10, and analyzed by an analysis computer system (which may be the payment network server 5 itself, but may alternatively be a separate computer system), typically after a certain amount of information in respect of each payment card has accumulated. For example, the payment network server 5 can determine that a certain consumer makes payments in a certain geographical region, from certain merchants, at certain times. Various mechanisms exist to enrich the information gathering procedure, for example using information the payment network server 5 receives about the consumer from the issuing bank server 7.

BRIEF SUMMARY OF THE INVENTION

The disclosure is based on the realization that the conventional payment card payment process is evolving in a manner which means that for certain consumers the payment network may no longer able to collect as much information as is currently the case.

In general terms the disclosure proposes that an analysis server (which may be a payment card network server but may also be a separate computer system, typically operated by the same payment network), which has access to information about the spending of a certain consumer, is operative to determine when the consumer has taken an action which is indicative of the consumer having developed a new payment channel which is not tracked by the payment network. In respect of such consumers, the analysis server automatically analyses the tracked spending behavior of the consumer before and after the consumer took this action, to identify differences between the spending behavior before and afterwards. By aggregating this information among multiple consumers, the analysis server obtains data characterizing consumer spending using the new payment channel.

The new spending channel may be a "mobile wallet" facility produced by a software application running on the consumer's communication device. In this case, the consumer has an account with a company ("mobile wallet company") which operates the mobile wallet application. The consumer can use a payment card to make an initial payment to the company to produce a positive balance the account ("charges" the account), and periodic payments to top-up the account ("recharges" the account). So long as the account has a positive balance, the application interacts with POS terminals and/or online stores to make payments using the account. This may be by electronic or wireless interactions between the communication device and a POS terminal or an online store. When consumer makes a purchase from the POS terminal or the online store operated by a merchant, the mobile wallet account is debited, and the "mobile wallet" company arranges a corresponding payment to a merchant. This payment may be carried out later, as part of a clearing operation dealing with payments from many consumers. The payments may not involve the payment network server, so the payment network is not able to track them directly. Even if the payment network server is involved, it may not be able to able to obtain directly information of the transactions of the individual consumers.

However, by using the systems and methods detailed in the present disclosure, the payment network can infer statistical properties of the payments multiple consumers make using mobile wallets.

Preferably, the analysis of the tracked spending behavior of the consumers before and after the payment system has registered the new spending channel, is performed in respect of a plurality of merchant classes, with at least some of the merchant classes being defined as merchants in a certain commercial sector. In this way, the analysis should not be influenced by consumers switching their spending between merchants in the same commercial sector.

The action which alerts the payment network to the fact that the consumer is using a mobile wallet as a new payment channel may be the first payment the consumer makes using the payment card to an account associated with the mobile wallet company. Alternatively, the payment network may determine whether, in respect of a given payment card, one or more criteria relating to payments to the mobile wallet company are met, such whether a certain number of payments is made to the mobile wallet company's account(s) during a certain period, and/or whether the total payment to the mobile wallet company's account(s) is above a threshold.

All steps of the method are preferably performed automatically. The term "automatic" is used in this document to refer to a process which is performed substantially without human involvement, save possibly for initiation of the process.

As used in this document, the term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers.

It will be appreciated that the method detailed in the present disclosure may be embodied as the server which performs the method.

BRIEF DESCRIPTION OF THE SEVERAL VIEWS OF THE DRAWINGS

An embodiment will now be described for the sake of example only with reference to the following drawings, in which.

DETAILED DESCRIPTION OF THE INVENTION

Figure 1:
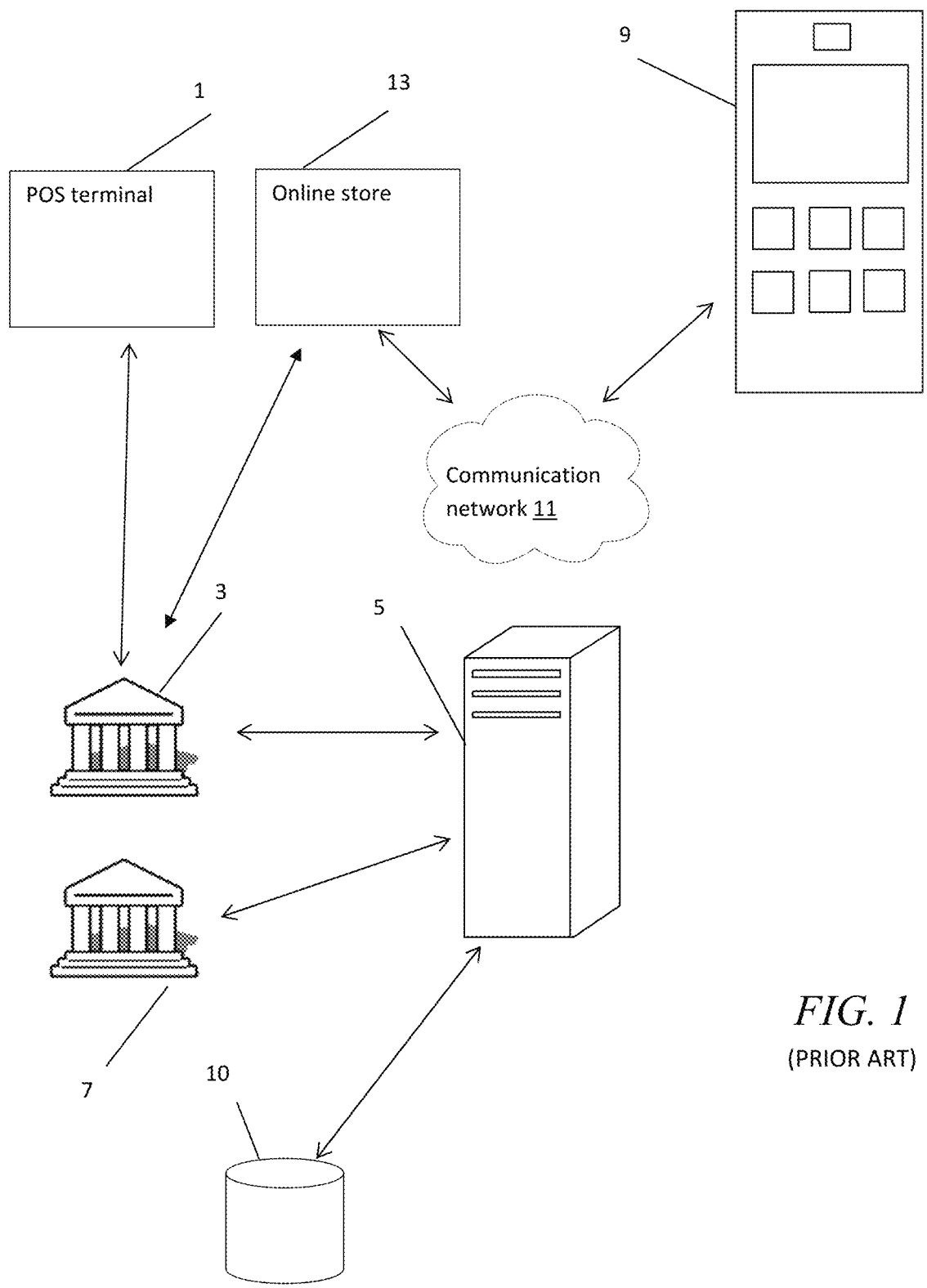
FIG. 1 shows schematically a conventional computerized network for performing a payment process using a payment card.
Figure 2:
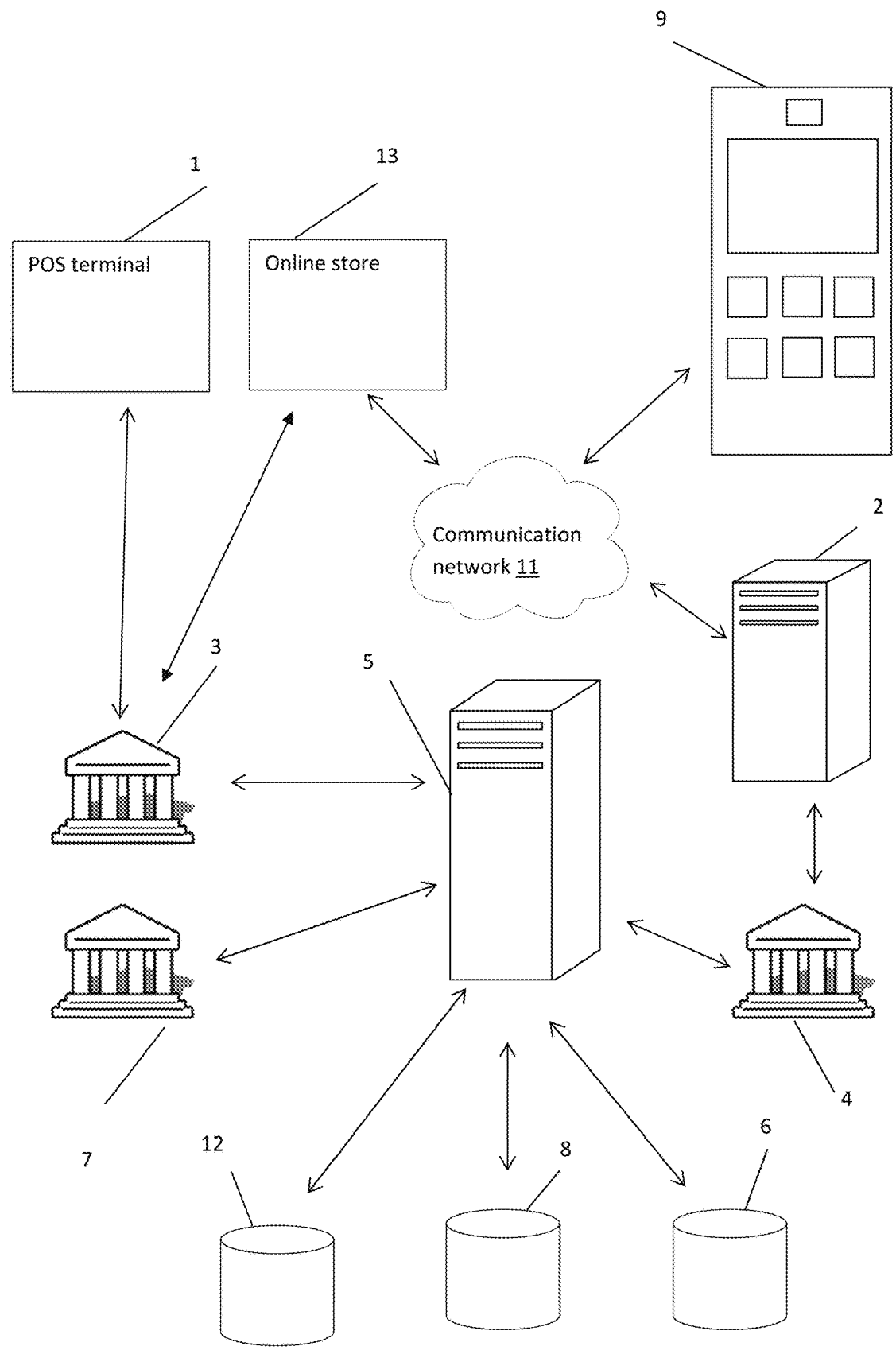
FIG. 2 shows schematically a computerized network which is suitable to perform a method according to the present disclosure.
Figure 3:
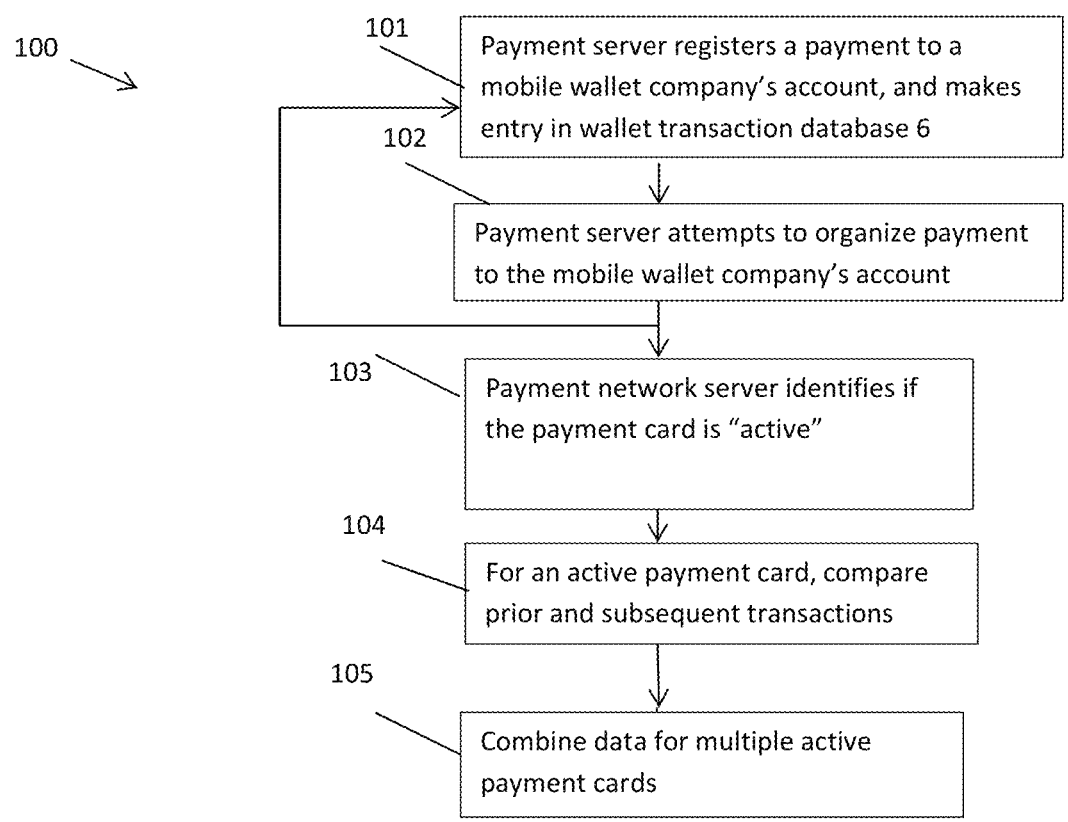
FIG. 3 is a flow diagram of a method which is invention method according to the present disclosure.

Referring firstly to FIG. 2, a computerized network is shown which is suitable for performing a method illustrated in FIG. 3. Many of the elements of FIG. 2 are as in the known system of FIG. 1, and are designated here by the same reference numerals.

In contrast with the computerized network of FIG. 1, the computerized network of FIG. 2 includes a server 2 associated with a mobile wallet company which operates a mobile wallet service. The server 2 is termed here a mobile wallet server. The mobile wallet company maintains a payment account at a financial organization (e.g. a bank) which operates a server 4. Note that this may be the same financial organization at which a payment account is maintained the merchant which operates the POS terminal 1 or online store 13. In other words, servers 3 and 4 may be the same. In a variation of this scheme, the servers 2 and 4 may be integrated into one, for example if the mobile wallet company is a bank.

The consumer uses the communication device 9 to communicate with the server 2 over the communication network 11. Initially, the consumer downloads an application from the server 2 into the communication device 9. Using the application, the consumer sets up a payment account with the mobile wallet company. The payment account is termed a "mobile wallet". The consumer enters details of the consumer's payment card into the application, and instructs the application to transfer some money into the mobile wallet.

At this stage, the mobile wallet server 2 contacts the server 4 of the bank where it maintains an account, and the server 4 contacts the payment network server 5 to arrange for a payment to be made to the mobile wallet company's account from the consumer's account at the issuer bank.

The payment network server 5 then commences the method 100 shown in FIG. 3. It is to be understood that FIG. 3 shows only steps which are different as between the system of FIG. 1 and FIG. 2. For example, the conventional steps the payment network server 5 performs to processing payments to the POS terminal 1 or the online store 13 using the payment card, are not shown. These conventional steps may be interleaved with the steps shown in FIG. 3.

In step 101, the payment network server 5 registers the fact that, in respect of the consumer's payment card, it has been instructed to make a payment to the mobile server's account. The data received by the payment network server 5 typically includes the identity of the recipient of the payment, so the payment network has sufficient information to do this. It enters this information into a wallet transaction database 6.

In step 102, the payment server contacts the server 7 of the issuer bank, to obtain an authorization of the transaction. The issuer banks makes a decision, and transmits a message to the payment network 5, which forwards it to the server 4, which in turn forwards it to the server 2.

If the decision is positive, the server 4 credits the amount to the account of the mobile wallet company, and the mobile wallet company credits it to the mobile wallet (optionally, less a handling charge). At a subsequent time (possibly during a clearing operation) a payment will be made from the issuer bank to the bank associated with the server 4.

The consumer can now make purchases from the mobile wallet to POS terminals such as the POS terminal 1, and/or to online stores such as the online store 13. The payments are managed by the server 2, possibly via private arrangements between the mobile wallet company and the merchant(s) operating the POS terminals and the online stores. Even if these payments involve a payment network, it may not be the payment network associated with the payment network server 5. Furthermore, typically the messages relayed by a payment network between the mobile wallet company and the merchants do not contain information sufficient to identity the consumer. Thus, the payment network server 5 has no direct method of tracking the consumer's spending using the mobile wallet.

A consumer who makes active use of his or her mobile wallet, will have to recharge the mobile wallet periodically. That is, steps 101 and 102 will have to be repeated. Each time step 101 is repeated, an additional entry in respect of the payment card is made in the wallet transaction database 6.

In step 103, the payment network server 5 identifies the payment cards for which the activity recorded in the wallet transaction database 6 meets one or more criteria. This indicates the mobile wallet of the corresponding consumer is active (e.g. frequently used). For example, one criterion may be payment cards for which the number of recharging operations is above a threshold. Another possible criterion is whether the total sum transferred to the mobile wallet is above a threshold. Another possible criterion may be based on the regularity of the recharging steps. The payment cards which met the one or more criteria are identified by the payment network server 5 as "active".

Of course, the consumer may still continue to use the active payment card for certain purchases, and in respect of these transactions the payment network server will continue to record details. The payment transactions which are performed after the payment card is identified as active are referred to as "subsequent transactions"; by contrast, the transactions recorded in the prior transaction database 12 before the payment card is identified as active are referred to as "prior transactions". The subsequent transactions are recorded in a subsequent transaction database 8 (step 105). In a variation of the embodiment, the subsequent transactions for the payment card may continue to be recorded in the prior transaction database 12.

After a certain time has passed (e.g. 3 months), in step 104 the payment network server 5 compares the subsequent transactions for each active payment card with its prior transactions, and generates difference data characterizing the differences between the prior transactions and the subsequent transactions. For example, the payment transactions to certain merchant classes (e.g. taxi providers or coffee shops) may have ceased, and payments to other merchant classes may have decreased. Some of these differences are due to the consumer having started to make purchases using the mobile wallet, which do not show up in the subsequent transaction database 8. Other of the differences, of course, may be for other reasons, such as random differences in the consumer's spending patterns over time.

Optionally, the prior transactions used in the analysis may be limited to transactions in a certain time window (e.g. 3 months) before the entry was made in the wallet transaction database 6. In other words, step 106 may be comparing two 3 month periods. In variations of the method, either of these two periods may be of different lengths (e.g. any time in the range 3 to 6 months).

In step 105, the payment network server 5 combines statistically the difference data in respect of many of the consumers, to generate aggregated difference data in respect of the merchant classes. The aggregated difference data is indicative of correlations in the difference data for different customers. For example, if it is determined that for 40% of the active payment cards for which the prior transactions include payments to merchants in a certain class, the subsequent transactions do not include a payment to merchants in the class, then it may be inferred that 40% of the consumers with mobile wallets are now using the mobile wallet to make the transactions to merchants of that class. The step of aggregating the data over the large number of consumers very much reduces components of the difference data which are due to random differences in the spending patterns of individual consumers.

Note that steps 106 and 107 may be performed in other ways in different embodiment of the invention. For example, instead of working out the differences between the prior transactions and the subsequent transactions for individual consumers (i.e. step 106), the prior transactions for multiple consumers may be aggregated and the subsequent transactions for multiple consumers may be aggregated, and then the aggregated prior transactions may be compared to the aggregated subsequent transactions.

Many more sophisticated versions of this analysis are possible taking into account any additional information which may be available. For example, if demographic data is available in a demographic database, an embodiment of the invention may use it to segment the cardholders who are determined to have begun to use a mobile wallet into smaller groups prior to comparing their spend before and after they began to use the mobile wallet. This can make the embodiment more robust. In another example, a card database may be provided specifying that certain consumers have multiple payment cards associated with the payment network, and optionally once a certain payment card has been labelled as active all the consumer's other payment cards are labelled in the same way. Then, the data for all that consumer's payment cards may be aggregated in step 104.

Figure 4:
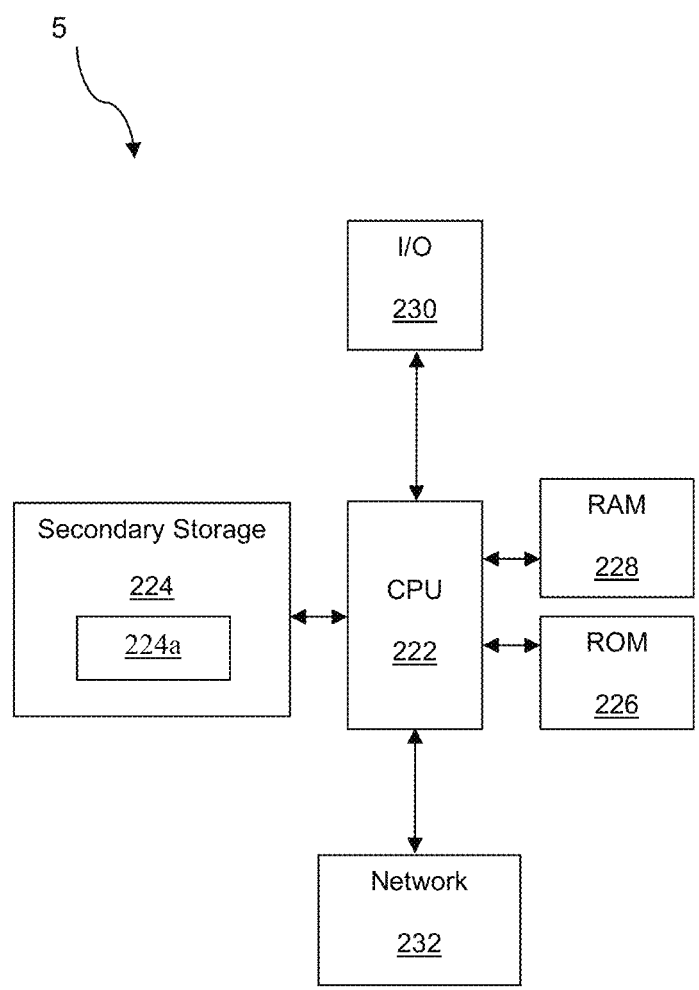
FIG. 4 shows the technical architecture of a payment network server of the computerized network of FIG. 1.

FIG. 4 is a block diagram showing a technical architecture of the server 5.

The technical architecture includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture may further comprise input/output (I/O) devices 230, and network connectivity devices 232.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution.

In this embodiment, the secondary storage 224 has a processing component 224a comprising non-transitory instructions operative by the processor 222 to perform various operations of the method of the present disclosure. The ROM 226 is used to store instructions and perhaps data which are read during program execution. The secondary storage 224, the RAM 228, and/or the ROM 226 may be referred to in some contexts as computer readable storage media and/or non-transitory computer readable media.

I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 220 to provide the functionality of a number of servers that is not directly bound to the number of computers in the technical architecture 220. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 222, the RAM 228, and the ROM 226 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Whilst the foregoing description has described exemplary embodiments, it will be understood by those skilled in the art that many variations of the embodiment can be made within the scope and spirit of the present invention.

For example, although in the description above the method of FIG. 3 is performed by the payment server 5, in a variation of the embodiment some or all of the steps may be performed by a separate computer system, typically one operated by the same payment network as the payment server 5. For example, the payment network server may have the known structure of FIG. 1 and operate in the conventional way described above, and a separate analysis server may be provided to screen the data in the transaction database 10 of FIG. 1 to identify payments made to mobile wallets (i.e. perform step 101), and thereby populate a wallet transaction database equivalent to the wallet transaction database 6 of FIG. 2. The analysis server may then use the data in the transaction database 10 to perform steps 103-105 of the method of FIG. 3. The analysis server may have the same technical architecture as that shown in FIG. 4.

In a further variation, the payment server 5 may perform steps 101 and 102 of the method of FIG. 3 as described above, thereby generating the database 6, but the analysis server may perform steps 103-105. Thus, the two payment server 5 and analysis server operate together as a single server, to perform collectively the steps of the method of FIG. 3.

What is claimed is:

1. A method, implemented with a computer system, of generating information characterizing payment transactions by a plurality of consumers, comprising:
   receiving, by a payment network server in a payment network, information describing the payment transactions made by the plurality of consumers using respective payment cards;
   identifying, by the computer system, one or more of the payment cards for which the payment transactions meet one or more criteria indicative of the corresponding consumer having begun a first use of a mobile wallet channel, the mobile wallet channel implemented via a mobile wallet server, wherein individual transactions conducted via the mobile wallet channel are unreported to the payment network server;
   entering, by the computer system, into a wallet transaction database, identifying information associated with the payment transactions that meet the one or more criteria, the information identifying a corresponding payment card as active indicating that a corresponding user has begun utilizing the mobile wallet channel;
   recording, by the computer system, into a subsequent transaction database, one or more payment transactions that are associated with the active payment card and that are transacted subsequent to the corresponding user beginning to utilize the mobile wallet channel;
   comparing, by the computer system, the payment transactions for the identified active payment card before and after the criteria were met in response to the active payment card being identified as active and the corresponding user beginning to utilize the mobile wallet channel;
   aggregating, by the computer system, for each of a number of sets of merchants, difference data characterizing statistical differences in the payment transactions to one or more merchants in the set of merchants before and after the criteria were met, wherein the aggregated difference data for each set of merchants is indicative of payments which are made using the mobile wallet channel to the one or more merchants in the set of merchants; and
   providing, by the computer system, the aggregated difference data to one or more users;
   further comprising causing the computer system to function as the payment network server, which upon receiving, over the payment network, a payment authorization request from a server of an acquiring bank in respect of a payment card, contacts, over the payment network, a server of an issuing bank which issued the payment card to seek authorization for the payment, and upon receiving, over the payment network, a response from the server of the issuing bank, relays the response to the server of the acquiring bank.

2. The computer-implemented method according to claim 1 in which the one or more criteria include a criterion of whether, for a certain one of the payment cards, there has been a payment transaction to an account associated with a company which operates a consumer payment process.

3. The computer-implemented method according to claim 2 in which the one or more criteria include a criterion of whether, for a certain one of the payment cards, there have been more than a predefined number of payment transactions to an account associated with a company which operates a consumer payment process.

4. The computer-implemented method according to claim 2 in which the criteria include a criterion of whether, for a certain one of the payment cards, the payment transactions to the account total more than a threshold amount.

5. The computer-implemented method according to claim 1 in which each set of merchants is a plurality of merchants in a corresponding commercial sector.

6. The computer-implemented method according to claim 1 in which, in the step of comparing the payment transactions, the statistical differences are derived in the form of statistical differences for each of a plurality of sets of customers, each set of customer category being ones of said customers who meet a respective set of demographic criteria, each of the customers having been allocated to one of more of the sets of customers based on demographic data for that customer.

7. The computer-implemented method according to claim 1 in which, in the step of comparing the payment transactions, in the case of a customer who, according to a database, is associated with multiple payment cards of which at least one is an identified payment card, the payment transactions for the multiple payment cards are aggregated.

8. A computer system arranged to receive information describing payment transactions made by a plurality of consumers using respective payment cards, the computer system comprising:
 a processor; and
 a data-storage device storing program instructions operative by the processor to cause the processor to:
  receive, by a payment network server in a payment network, information describing the payment transactions made by the plurality of consumers using respective payment cards;
  identify, by the computer system, one or more of the payment cards for which the payment transactions meet one or more criteria indicative of the corresponding consumer having begun a first use of a mobile wallet channel, the mobile wallet channel implemented via a mobile wallet server, wherein individual transactions conducted via the mobile wallet channel are unreported to the payment network server;
  enter, by the computer system, into a wallet transaction database, identifying information associated with the payment transactions that meet the one or more criteria, the information identifying a corresponding payment card as active indicating that a corresponding user has begun utilizing the mobile wallet channel;
  record, by the computer system, into a subsequent transaction database, one or more payment transactions that are associated with the active payment card and that are transacted subsequent to the corresponding user beginning to utilize the mobile wallet channel;
  compare, by the computer system, the payment transactions for the identified active payment card before and after the criteria were met in response to the active payment card being identified as active and the corresponding user beginning to utilize the mobile wallet channel;
  aggregate, by the computer system, for each of a number of sets of merchants, difference data characterizing statistical differences in the payment transactions to one or more merchants in the set of merchants before and after the criteria were met, wherein the aggregated difference data for each set of merchants is indicative of payments which are made using the mobile wallet channel to the one or more merchants in the set of merchants; and
  provide, by the computer system, the aggregated difference data to one or more users;
 wherein the program instructions are further operative, when implemented by the processor, to cause the computer system to function as the payment network server, which upon receiving, over the payment network, a payment authorization request from a server of an acquiring bank in respect of a payment card, contacts, over the payment network, a server of an issuing bank which issued the payment card to seek authorization for the payment, and upon receiving, over the payment network, a response from the server of the issuing bank, relays the response to the server of the acquiring bank.

9. The computer system according to claim 8 in which the one or more criteria include a criterion of whether, for a certain one of the payment cards, there has been a payment transaction to a predefined account.

10. The computer system according to claim 8 in which the one or more criteria include a criterion of whether, for a certain one of the payment cards, there have been more than a predefined number of payment transactions to a predefined account.

11. The computer system according to claim 10 in which the criteria include a criterion of whether, for a certain one of the payment cards, the payment transactions to the predefined account total more than a threshold amount.

12. The computer system according to claim 8, further comprising a demographic database which allocates each of the customers to one or more of a plurality of sets of customers based on demographic criteria, the program instructions being operative to cause the processor, when comparing the payment transactions, to derive the statistical differences in the form of statistical differences for each of the plurality of sets of customers.

13. The computer system according to claim 8, further comprising a card database indicating for at least one of the customers multiple corresponding payment cards associated with the at least one customer, the program instructions being operative to cause the processor, when comparing the payment transactions, in the case of a customer who, according to the card database, is associated with multiple payment cards of which at least one is an identified payment card, to aggregate the payment transactions for the multiple payment cards.

14. A non-transitory computer readable medium comprising computer executable instructions which when executed by a computer system cause the computer system to perform the method of generating information characterizing payment transactions by a plurality of consumers, the method comprising:
 receiving, by a payment network server in a payment network, information describing the payment transactions made by the plurality of consumers using respective payment cards;
 identifying, by the computer system, one or more of the payment cards for which the payment transactions meet one or more criteria indicative of the corresponding consumer having begun a first use of a mobile wallet channel, the mobile wallet channel implemented via a mobile wallet server, wherein individual transactions conducted via the mobile wallet channel are unreported to the payment network server;

entering, by the computer system, into a wallet transaction database, identifying information associated with the payment transactions that meet the one or more criteria, the information identifying a corresponding payment card as active indicating that a corresponding user has begun utilizing the mobile wallet channel;

recording, by the computer system, into a subsequent transaction database, one or more payment transactions that are associated with the active payment card and that are transacted subsequent to the corresponding user beginning to utilize the mobile wallet channel;

comparing, by the computer system, the payment transactions for the identified active payment card before and after the criteria were met in response to the active payment card being identified as active and the corresponding user beginning to utilize the mobile wallet channel;

aggregating, by the computer system, for each of a number of sets of merchants, difference data characterizing statistical differences in the payment transactions to one or more merchants in the set of merchants before and after the criteria were met, wherein the aggregated difference data for each set of merchants is indicative of payments which are made using the mobile wallet channel to the one or more merchants in the set of merchants; and providing, by the computer system, the aggregated difference data to one or more users;

wherein the computer executable instructions are further operative, when executed by the computer system, to cause the computer system to function as the payment network server, which upon receiving, over the payment network, a payment authorization request from a server of an acquiring bank in respect of a payment card, contacts, over the payment network, a server of an issuing bank which issued the payment card to seek authorization for the payment, and upon receiving, over the payment network, a response from the server of the issuing bank, relays the response to the server of the acquiring bank.

\* \* \* \* \*